July 4, 1950  G. SIMONIAN  2,513,526
DUAL PURPOSE HANDLE FOR PORTABLE SHOPPING CARTS
Filed Dec. 11, 1948

INVENTOR.
GERALD SIMONIAN
BY Naylor and Lassagne
ATTORNEYS

Patented July 4, 1950

2,513,526

UNITED STATES PATENT OFFICE 2,513,526

DUAL PURPOSE HANDLE FOR PORTABLE SHOPPING CARTS

Gerald Simonian, Fresno, Calif.

Application December 11, 1948, Serial No. 64,864

3 Claims. (Cl. 280—36)

This invention relates to shopping carts of the type which can be folded or collapsed to form a compact, portable unit when not in use and is more particularly directed to improvement in handle construction for a cart such as disclosed in my co-pending application, Serial Number 694,279, filed August 31, 1946, now Patent # 2,439,992 issued April 20, 1948.

The usual practice has been to provide shopping carts of the folding type with a handle for propelling and guiding the cart when in use and another handle for carrying the folded cart. The principal object of the present invention is to eliminate the separate carrying handle and provide a unitary handle structure serving as both a propelling and a carrying handle. Another object is to include means in the handle structure for holding it in cart propelling position, which means will also serve to lock the folding portions of the cart body in the open or expanded form.

The foregoing objects, as well as other objects and advantages which will be made evident, are attained by the construction hereinafter described and claimed and illustrated in the accompanying drawing where:

Figure 1:
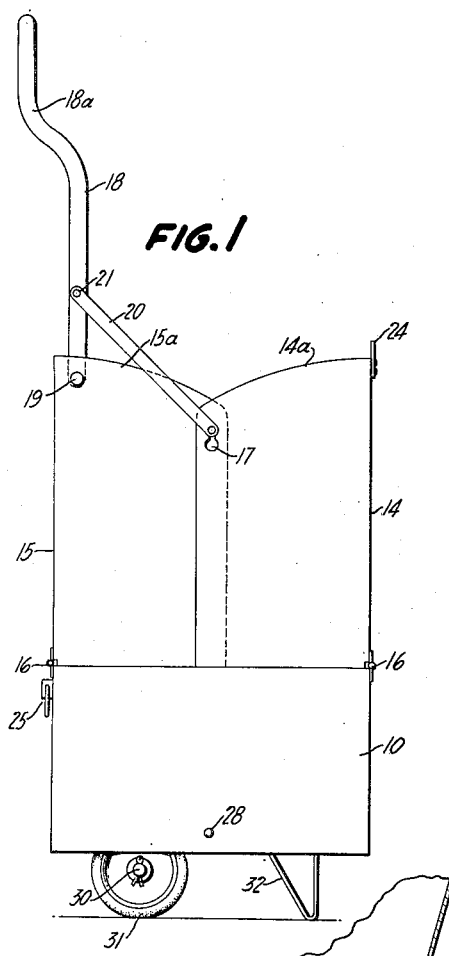
Figure 1 is a view in side elevation showing the cart opened and in condition for use.

Referring to the drawing, the cart comprises an oblong rectangular body or housing having side walls 10 and 11 and end walls 12 and 13. Opposite extension members 14 and 15 are hinged at the lower ends, as at 16 to the upper edges of the end walls 12 and 13 each member being equal in length to the distance between the end walls and each being formed with side wings 14a and 15a extending at right angles from the opposite longitudinal edges of the two extension members. The opposite pairs of side wings are designed to meet and form overlapping edges at approximately the central transverse vertical plane of the cart body, as shown in Figure 1. Each wing is provided with a key-hole type aperture 17 in its upper portion and these are positioned to register in each pair when the extensions 14, 15 are in upright position, for a purpose to be described.

Figure 4:
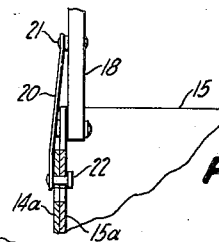
Figure 4 is a detail view of the locking prop and section of the handle, looking towards the left in Figure 1, and showing the lock-head on the end of the prop.
Figure 5:
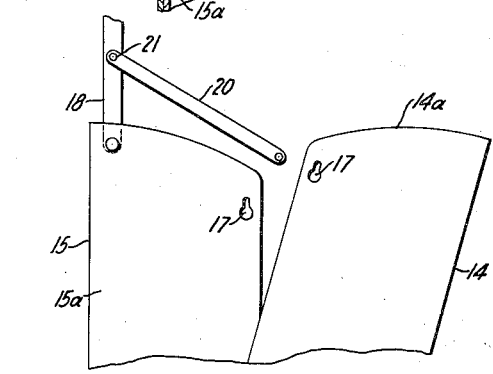
Figure 5 is a sectional detail view of the upper portion of the cart extensions showing the registering openings engageable by the lock-head on the prop.

A bail-shaped propelling and guiding handle 18 is pivotally connected at 19 to the inner sides of the side wings of extension 15 and each arm of the handle is provided with a locking prop or strut 20 of resilient metal which prop has one end pivoted to the handle at 21 and its other end provided with a latch or hook 22 (Figure 4) formed with a knob-like head adapted to pass through the larger openings of the registered apertures 17 whereupon the neck of the latch can enter the smaller openings with which it has a frictional or snap fit. This serves to lock the handle in extended position and at the same time to lock the extensions 14, 15, firmly in upright position, as in Figure 1 which shows the expanded or operating form of the cart. As the props 20 are of spring metal they can be bent to allow the knobs on hooks 22 to enter apertures 17 and a slight backward pull on the handle will cause the necks of the hooks to snap into the smaller end of said apertures to hold all related parts in position.

In connection with collapse of the cart into portable box-like form and in connection with the dual purpose of the handle 18, the end wall 12 of the cart body is provided with a transverse elongated slot 23 and the loop end of the handle with an offset at 18a adapted to extend through slot 23 when the cart is collapsed.

Figure 2:
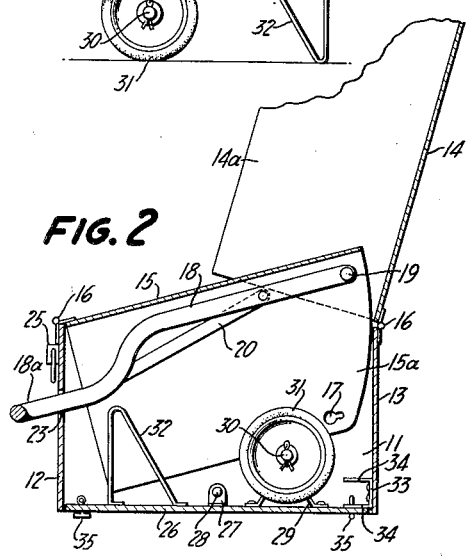
Figure 2 is a sectional view showing the extension members of the cart, plus the foldable handle, in partly folded position.

To close up the cart the props 20 are first released by reversing the steps above described whereupon the handle 18 is swung down within extension 15 and said extension folded down into the body of the cart as illustrated in Figure 2, with the offset end 18a of the handle projecting through slot 23. Extension 14 is then folded down over 15 and complemental latch elements at 24, 25 interlocked.

The bottom of the cart body is closed by a construction including retractable supporting wheels such as disclosed and claimed in my Patent No. 2,439,992, April 20, 1948, and comprising a panel 26 supported on pivotable angle strips 27 journaled on pins 28 at the middle of the side members 10, 11 of the cart body. At one side of its pivot panel 26 has a pair of spaced brackets 29 supporting an axle 30 on the ends of which the rubber-tired wheels 31 are journaled. The forward part of panel 26 carries a fixed central U-shaped support 32 which, together with wheels 31, provides a three-point support for keeping the cart upright when not being wheeled. As will be evident, panel 26 can be reversed on its axis at 28 to bring the wheels to and from operative position. To lock panel 26 in either position there is provided a bracket 33 secured to end wall 13 having vertically spaced slotted arms 34. These arms cooperate with rotatable keys, or fasteners, 35, at each end of panel 26 which are positioned to engage one or the other of the slots in the arms of bracket 33 in the respective positions of panel 26 and when so engaged turning the key 35 securely locks the panel.

Figure 3:
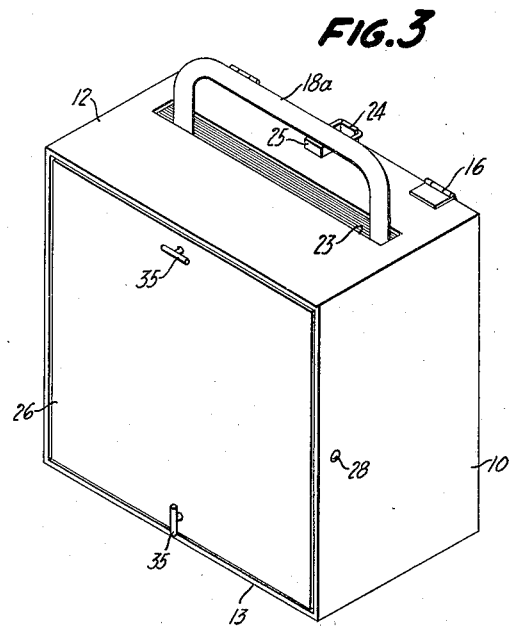
Figure 3 is a perspective view of the closed cart showing the handle positioned for carrying.

As will be seen, collapse of the extensions and handle as described and reversal of the bottom panel reduces the cart to the form shown in Figure 3 where the projecting offset portion of the handle serves as a carrying handle for the collapsed cart.

Minor modifications are obviously possible within the scope of the invention as defined in the following claims:

What is claimed is:

1. A cart of the class described comprising a rectangular box-like body having a wall thereof provided with a transverse slot, an extension panel hinged to the upper edge of said wall and provided with side wings, a similar panel and wings on the opposite wall, the side wings of the respective extension panels meeting in overlapped relation substantially midway of the body when the panels are upright, said wings being formed with locking apertures positioned to register when the panels are upright, a bail-shaped guiding handle pivoted to the upper end of one extension panel and foldable within it, locking props with one end pivoted to the arms of the handle and the other provided with locking catches engageable in the apertures of the side wings to lock the handle and extension panels in upright positions, said panels being foldable one upon the other with the loop end of the handle projecting through said slot.

2. A cart of the class described comprising a rectangular box-like body having a wall thereof provided with a transverse slot, an extension panel hinged to the upper edge of said wall and adapted to form a closure for the body, and a guiding handle pivoted to the upper end of said panel and foldable with the panel to extend within the body, said handle having a terminal loop portion passing through said slot when the panel is closed.

3. A cart of the class described comprising a rectangular box-like body, extension panels hinged to opposite walls of said body having side wings meeting substantially midway of the body when the extensions are in upright position, a bail-shaped guiding handle pivoted to the upper end of one extension panel and foldable within it, locking props pivoted on the arms of the handle, and latching means on the free ends of the props engageable with the meeting edges of the side wings to lock the extensions and handle in upright positions.

GERALD SIMONIAN.

REFERENCES CITED

The following references are of record in the file of this patent:

UNITED STATES PATENTS

| Number | Name | Date |
|---|---|---|
| 877,350 | Long | Jan. 21, 1908 |
| 1,450,193 | Thomas | Apr. 3, 1923 |